Jan. 12, 1926.  
R. R. MILLER  
CONVERTER ATTACHMENT FOR DRIVE WHEELS  
Filed June 17, 1922  
1,569,099  
3 Sheets-Sheet 1
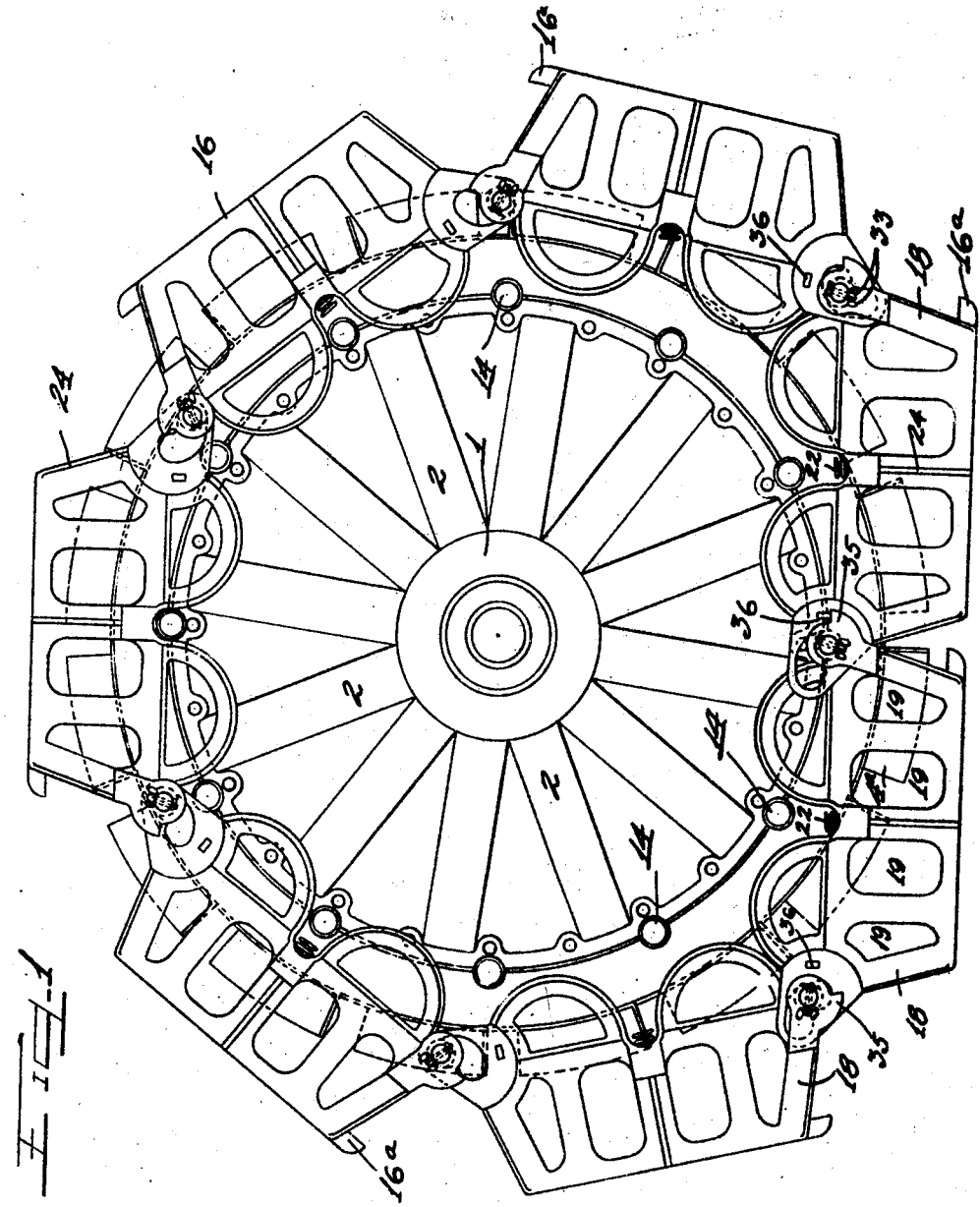

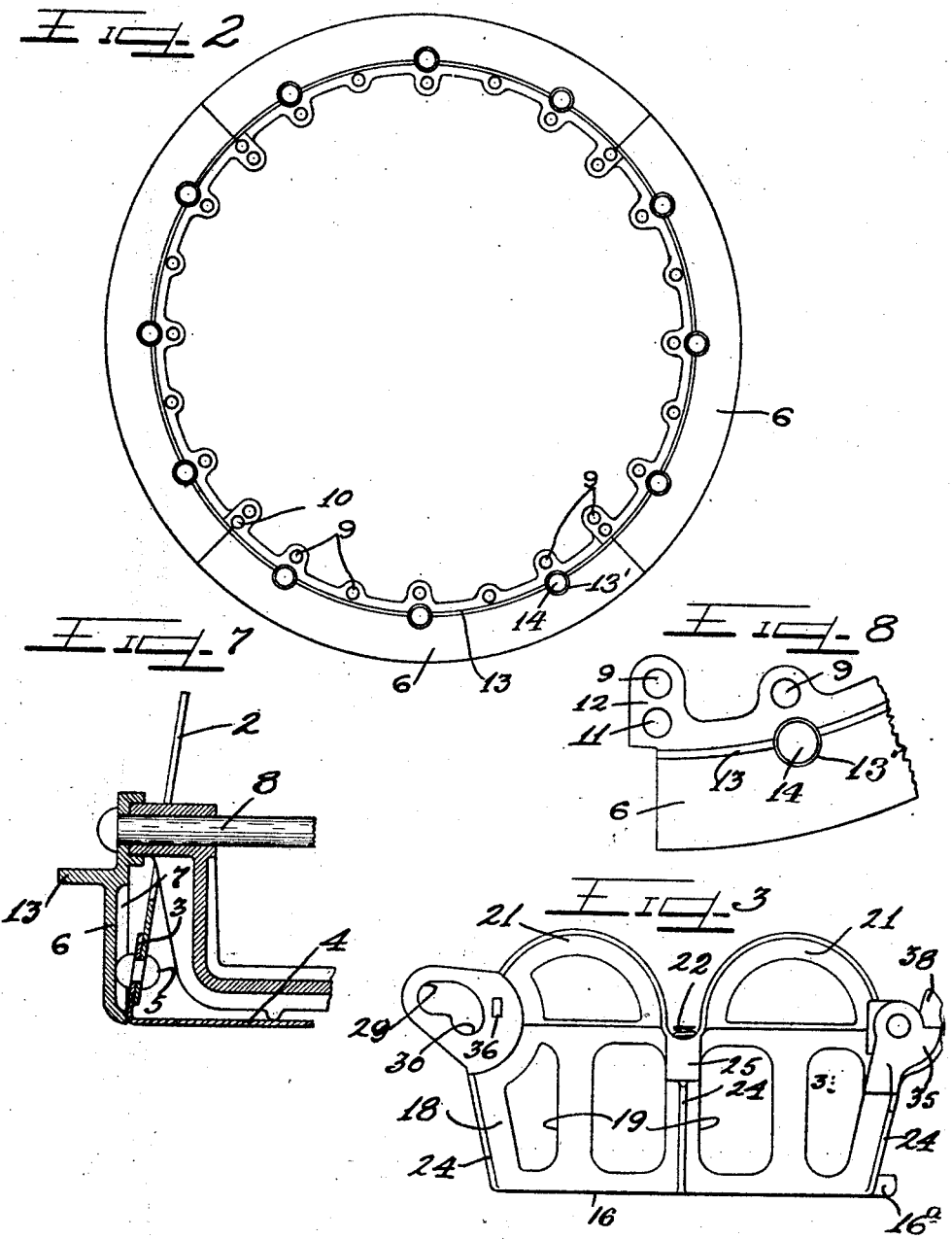

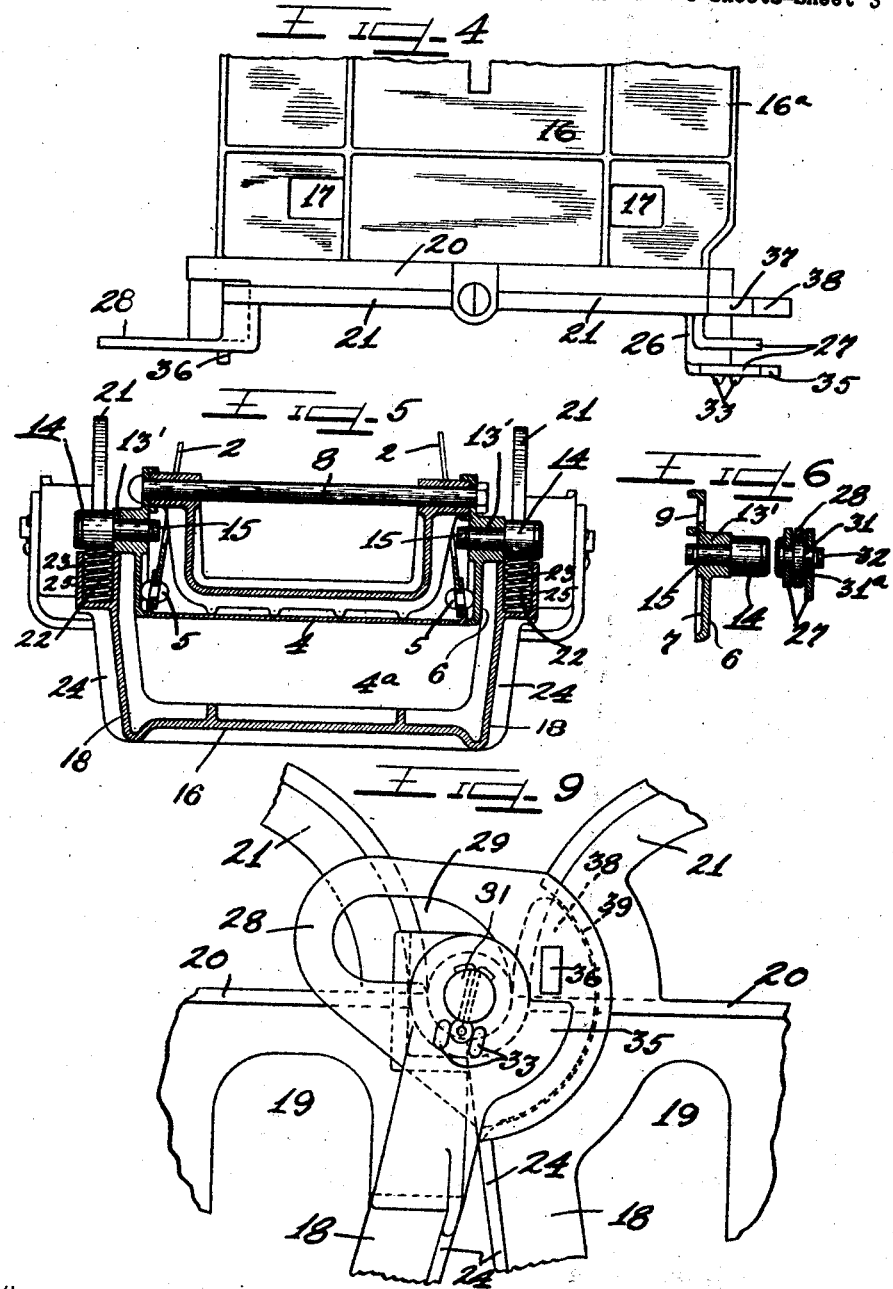

Patented Jan. 12, 1926.

1,569,099

UNITED STATES PATENT OFFICE.

ROYAL R. MILLER, OF CHICAGO, ILLINOIS, ASSIGNOR TO MILLER TRACTION TREAD COMPANY, A CORPORATION OF DELAWARE.

CONVERTER ATTACHMENT FOR DRIVE WHEELS.

Application filed June 17, 1922. Serial No. 568,992.

*To all whom it may concern:*

Be it known that I, ROYAL R. MILLER, a citizen of the United States, and a resident of the city of Chicago, in the county of Cook and State of Illinois, have invented certain new and useful Improvements in a Converter Attachment for Drive Wheels; and I do hereby declare that the following is a full, clear, and exact description of the same, reference being had to the accompanying drawings, and to the numerals of reference marked thereon, which form a part of this specification.

This invention relates to a converter attachment for drive wheels and particularly to a mechanism which is adapted to be used to convert tractor drive wheels into track-laying tread drive wheels, the present invention disclosing improvements in the structure shown in my co-pending application for U. S. Letters Patent, Serial No. 472,837.

It is an object of this invention to provide a track-laying tread attachment for drive wheels wherein the tread elements are supported and driven from each side of the drive wheel and whereby an ordinary tractor drive wheel may be converted to a track-laying tread drive wheel without removing the traction cleat therefrom.

It is another object of this invention to provide a track-laying tread attachment for drive wheels having cushioning means between the tread elements and the driving means therefor.

It is also an object of this invention to provide a converter attachment of the class described which may be mounted on drive wheels of various types.

It is a further object of this invention to provide a track-laying tread mechanism which will operate with a minimum of noise.

It is an important object of this invention to provide a track-laying tread mechanism having improved means for connecting the tread elements.

It is a further object of this invention to provide means for locking adjacent tread elements from relative movement when in ground engaging position.

It is finally an important object of this invention to provide an easily attachable efficient track-laying tread mechanism.

Other and further important objects of this invention will be apparent from the disclosures in the specification and the accompanying drawings.

The invention (in a preferred form) is shown on the drawings and hereinafter more fully described.

On the drawings:

Figure 1 is a side elevation of a tractor drive wheel equipped with the improved track-laying tread mechanism of this invention.

Figure 2 is a side elevation of one of the driving annuli.

Figure 3 is a side elevation of one of the tread elements.

Figure 4 is a fragmentary plan view of the inside of one of the tread elements.

Figure 5 is an enlarged section through one of the tread elements and driving means therefor with parts in elevation.

Figure 6 is an enlarged detail section showing the relation between certain of the driving and connecting means.

Figure 7 is an enlarged detail section showing the method of attaching the driving and supporting annulus.

Figure 8 is an enlarged detail section of a part of the driving and supporting annulus.

Figure 9 is an enlarged fragmentary elevation of the tread element locking means.

As shown on the drawings:

The track-laying tread mechanism of this invention is adapted to be used to convert an ordinary tractor drive wheel into a track-laying tread type drive wheel without any alteration thereof, and in the accompanying drawings, the hub of said drive wheel is represented by the reference numeral 1. Extending outwardly from said hub 1 are a plurality of spokes 2 which are secured to inwardly extending flanges 3 on the wheel rim 4 by means of rivets 5. Usual traction cleats 4ª are ordinarily secured to said rim 4. Engaged on each side of the wheel outside the flanges 3 is a driving and supporting annulus 6 and said annuli 6 are provided at intervals with depressions 7 which are engaged over the heads of the rivets 5, thus acting to properly position the annuli. Said annuli 6 are drawn snugly against the flanges 3 and held in proper position by means of long bolts 8 which extend through apertures 9 formed in inwardly extending bosses on said annuli, the sides of said bolts 8 abutting against the edges of the spokes 2

(Figures 7 and 8). In view of the fact that ordinary tractor drive wheels are made with various numbers of spokes, a large number of the apertures 9 are provided, these apertures being properly positioned to receive connecting bolts 8 which are especially adapted to be used for connecting the annuli 6 in a number of standard tractor drive wheel constructions. As shown in Figures 2 and 8, each annulus 6 is constructed of a number of sections which are secured together by the engagement of bolts 10 which extend through apertures 11 formed in bosses 12 which overlap similar bosses on an adjacent section which are provided with registering apertures. Said bosses 12 are also preferably provided with apertures 9 through which the connecting bolts 8 may be engaged. Each annulus 6 is provided with an integral outwardly extending coaxial flange 13 which is adapted to support the tread elements in a manner to be described hereinafter, and extending outwardly at spaced intervals from each of said flanges 13 is a roller 14 which is mounted on the end of a pin 15 extending through an apertured boss 13' integral with said flange. Said rollers 14 are adapted to drive, and the flanges 13 to support, the track-laying tread elements which will now be described. Each of said tread elements comprises a ribbed ground engaging plate 16 having an extension 16ª at the center of one end. Said plate is provided with apertures 17 for attaching extension ground plates and is also provided with integral side portions 18 which extend inwardly therefrom in a vertical plane. Said side portions 18 are cut away at 19 to reduce the weight of the tread elements and to prevent objectionable noise due to resonance, and integrally formed on the inner edges of said side portions are horizontal flanges 20 which are adapted to engage the flanges 13 on the annuli 6. As indicated in Figures 1, 3 and 9, the ends of said side portions 18 are formed inwardly so that the tread elements as a whole somewhat resemble the frustrum of a pyramid. Also integral with the side portions 18 and formed outside the flanges 20 on each tread element are semi-circular tooth members 21 which are adapted to have the rollers 14 engaged therebetween so that the annuli may transmit a driving action to the tread elements. The flanges 20 are cut away between said tooth members 21 and are also cut away at the ends thereof to permit the rollers 14 to be engaged therebetween, and in order to cushion the engagement of the rollers with the side portions between said tooth members, helical springs 22 are mounted between the tooth members in recesses 23 formed in said side portions 18. In order to add rigidity to the construction of the tread members, said side portions 18 are preferably reinforced by integral ribs 24 which extend downwardly on the outside thereof from bosses 25 in which the recesses 23 are formed.

Improved means are provided for connecting the tread elements with a lost motion connection whereby the proper driving relation between the same and the supporting and driving annuli 6 is maintained. For this purpose, outwardly extending members 26 are integrally formed on one end of each side portion 18 and each of said members 26 acts to support an apertured bifurcated lug 27 which is adapted to be engaged over a lug 28, formed on the abutting ends of the side portions of an adjacent tread member. Each of said lugs 28 is provided with a slot comprising portions 29 and 30, the center lines of which form an obtuse angle, and engaged through said slot and through the apertures in the bifurcated lug 27 is a connecting pin 31 which is secured therein by means of a cotter pin 32, the head of said cotter pin being engaged between bosses 33 formed on the outsides of the lugs 27 whereby said pins 31 are prevented from rotating. To reduce friction between the pin 31 and the slot 29—30, a roller 31ª is mounted on said pin and engages the edges of said slot.

As will be noted from an examination of Figure 6, the lugs 27 and 28 are sufficiently offset from the side portions 18 of the tread elements to permit the heads of the pins or shafts 15 to easily pass the heads of the pins 31.

Formed on the side of the tread elements at one end thereof as a continuation of the outer arm of the bifurcated lug 27 are lugs 35 (best shown in Figure 9) which are adapted to be engaged under bosses 36 formed on and extending outwardly from an adjacent tread member when said tread members are in ground engaging position. This locking effect is made possible by the fact that the pin 31 is in the portion 30 of the connecting slot and undue strain on the pivotal connections is prevented by the extensions 16ª on the tread elements.

Formed as a continuation of the tooth members 21 are depressions 37 which are adapted to receive the rollers 14 to aid in the locking action and extending upwardly and outwardly from said depressions in a plane parallel to the plane of the lugs 27 are curved members 38 which are adapted to engage curved surfaces 39 formed on an adjacent tread member.

The operation is as follows:

In order to convert a tractor drive wheel into a track-laying tread drive wheel by the employment of the converter mechanism of this invention, it is first necessary to secure the annuli 6 in position on each side of the wheel by means of the bolts 8, and in view of the fact that said annuli are separable, it is possible to do this without removing the drive wheel from the tractor. In securing the annuli 6 on the wheel, the depressions 7 therein are engaged over the heads of the rivets 5 and the bolts 8 are engaged through oppositely positioned apertures 9 in accordance with the number and position of the spokes 2 in the drive wheel. The tread elements are then engaged over the wheel and are connected by the pins 31 and the wheel is ready for operation. On account of the side members 18, it is possible to use the tread elements on a drive wheel without previously removing the ordinary traction cleats 4ª, and because of this construction, the wheel may be very quickly converted. When the tread elements are in position, the rotation of the drive wheel, of course, causes the same to be successively deposited on the surface over which the vehicle is traveling, and since these tread elements afford a large area for contacting said surface, the tractive efficiency of a drive wheel equipped therewith is very high. The peculiar formation of the slots 29, 30 allows sufficient relative movement between the tread elements to maintain the same in true rolling relation with the flanges 13 and at the same time to afford a proper drive thereof by the rollers 14. As will be noted from an examination of Figure 1, the pins 31 are engaged in the portions 30 of said slot during the time that the tread elements are in contact with the ground and that the same become disengaged from said portions 30 and move into the portions 29, thus allowing a relative movement of the tread elements, as the same are lifted from the ground, the pins 31 being at the same time held from rotation by the engagement of the head of the cotter pin 32 between the bosses 33. The engagement of the tread elements with the rollers 14 is at all times cushioned by the spring 22, the life of said rollers and of the entire mechanism being greatly lengthened by the resilient cushioning effect of said spring. The engagement of the locking lugs 35 under the bosses 36 serves to maintain adjacent tread elements in proper ground engaging position as clearly shown in Figures 1 and 9. On account of the open construction of the tread elements, the mechanism operates with a minimum of noise since there are no large resonating surfaces. It will thus be seen that the track-laying tread mechanism of this invention may be easily attached to convert a standard drive wheel into a track-laying tread drive wheel, and it will also be evident that the mechanism is strong, durable, and that the same may be economically constructed.

I am aware that numerous details of construction may be varied through a wide range without departing from the principles of this invention, and I therefore do not purpose limiting the patent granted, otherwise than necessitated by the prior art.

I claim as my invention:

1. The combination with a drive wheel, of an annulus on each side thereof, rollers projecting outwardly from each annulus, means extending transversely of the drive wheel for securing said annuli together, and connected tread members supported on the annuli and driven by engagement with the rollers.

2. The combination with a drive wheel and the spokes thereof, of a driving and supporting annulus on each side of the wheel, means extending transversely of the wheel and abutting the spokes for connecting said annuli, and connected tread members supported on and driven by said annuli.

3. The combination with a drive wheel, of an annulus mounted on each side thereof, means extending transversely of the drive wheel and connecting the annuli, a coaxial annular shoulder formed on each annulus, tread elements engaged over the annuli and adapted to roll on said shoulder and having depressions formed therein, and means projecting laterally from the annulus and engaging in said depressions to transmit a drive to the tread elements.

4. The combination with a drive wheel, of an annulus mounted on each side thereof, means extending transversely of the drive wheel and connecting the annuli, a coaxial annular shoulder formed on each annulus, tread elements engaged over the annulus and adapted to roll on said shoulder and having depressions formed therein, resilient means in the depressions, and means projecting laterally from said annuli and engaged in said depressions to transmit a drive to the tread elements.

5. The combination with a drive wheel, of an annulus mounted on each side thereof, means extending transversely of the drive wheel and connecting the annuli, a coaxial annular shoulder formed on each annulus, tread elements engaged over the annuli and adapted to roll on said shoulder and having depressions formed therein, helical spring projecting from the bottom of each depression, and means projecting from the annuli and engaged in said depression to transmit a drive to the tread elements.

6. In a track-laying tread mechanism, driving means, connected tread elements engaging said driving means, and cushioning means between the tread elements and the driving means at the point of connection between the said tread elements.

7. In a track laying tread mechanism, a plurality of tread elements, connecting means on said tread elements, slots in said connecting means each consisting of portions making an obtuse angle with each other, and means on adjacent tread elements engaged through said slots.

8. In a track-laying tread mechanism, a plurality of tread elements, connecting means on said tread elements, slots in said connecting means each consisting of portions making an angle with each other, and pins removably engaged through an adjacent tread element and through said slots.

9. In a track-laying tread mechanism, a plurality of tread elements, connecting means on said tread elements, slots in said connecting means each consisting of portions making an angle with each other, pins removably engaged through an adjacent tread element and through one of said slots, and means for preventing the pins from rotating.

10. In a track-laying tread mechanism, a plurality of tread elements, connecting means on said tread elements, slots in said connecting means, each consisting of portions making an obtuse angle with each other, pins removably engaged through an adjacent tread element and through one of said slots, retaining means engaged through the pins, and means associated with the retaining means for preventing rotation of the pins.

11. In a track-laying tread mechanism, a plurality of tread elements, connecting means on said tread elements, slots in said connecting means each consisting of portions making an angle with each other, pins removably engaged through an adjacent tread element and through said slots, and rollers on said pins engaging the edges of the slots.

In testimony whereof I have hereunto subscribed my name.

ROYAL R. MILLER.